United States Patent

[11] 3,629,087

[72] Inventor Herbert Rubin
 Livingston, N.J.
[21] Appl. No. 868,707
[22] Filed Oct. 23, 1969
[45] Patented Dec. 21, 1971
[73] Assignee Inmont Corporation
 New York, N.Y.

[54] PROCESS OF ELECTRODEPOSITION USING COMPOSITE MEMBRANE MEANS
5 Claims, 2 Drawing Figs.

[52] U.S. Cl. .................................... 204/181,
 204/296
[51] Int. Cl. .................................... B01k 5/02,
 B01k 3/10
[50] Field of Search ............................ 204/181,
 296

[56] References Cited
 UNITED STATES PATENTS
3,304,250 2/1967 Gilchrist ..................... 204/181
3,444,066 5/1969 Brewer et al. ................ 204/181
 FOREIGN PATENTS
 918,626 2/1963 Great Britain ................ 204/181

Primary Examiner—Howard S. Williams
Attorneys—F. W. Wyman and Philip R. Arvidson ABSTRACT: A composite membrane means and process for its use in electrodeposition of solubilized resins. The membrane means comprises a relatively inert nonconducting porous supporting matrix, preferably polyethylene, and a gel, preferably agar or agarose having a high water content, in the matrix and forming therewith a relatively strong substantially continuous membrane. The gel is substantially inert and has a low resistance to permeation by water and low molecular weight ions formed by ionization of the resins and is substantially impervious to high molecular weight ions formed by ionization of said resins.

INVENTOR.
HERBERT RUBIN

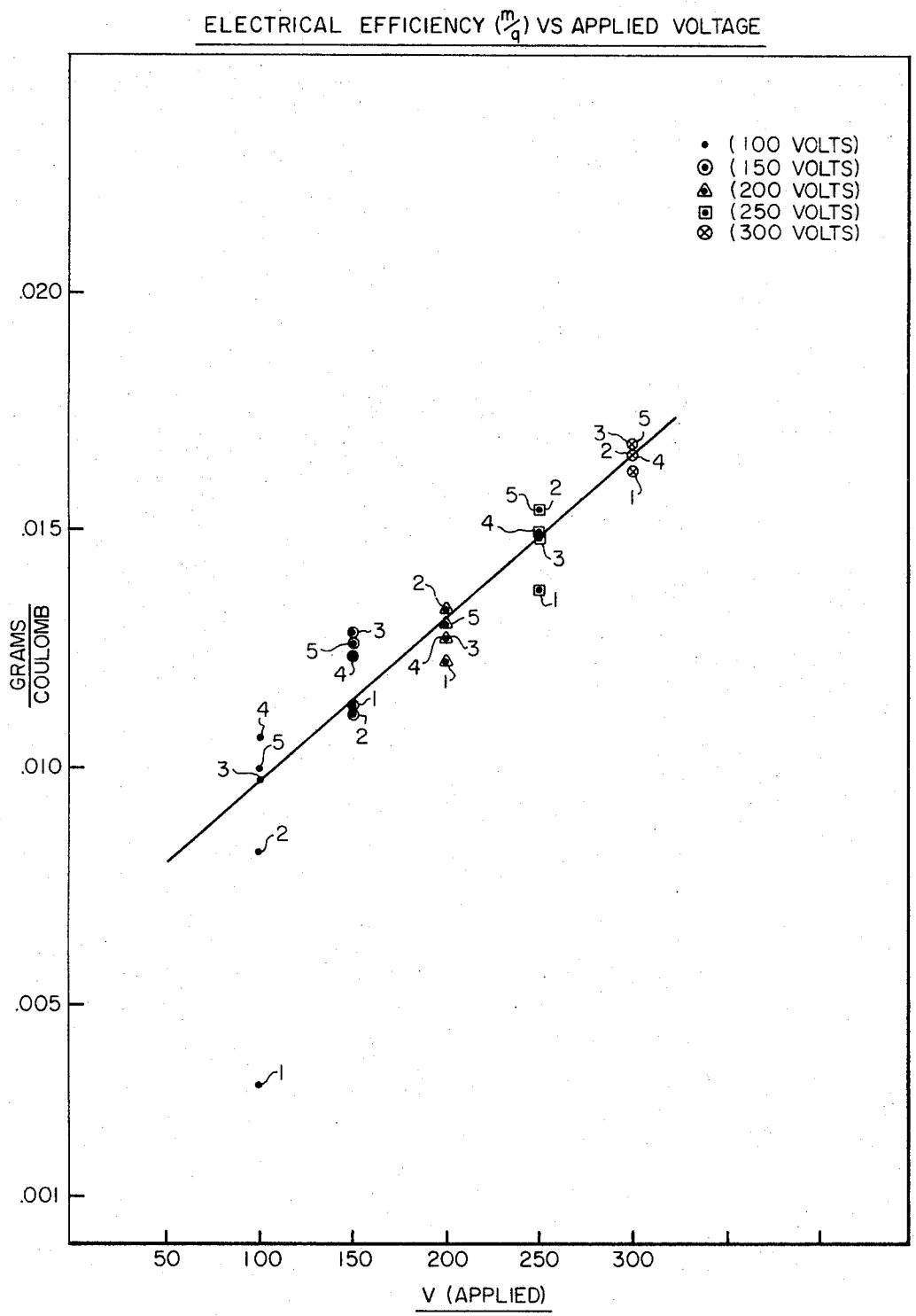

PROCESS OF ELECTRODEPOSITION USING COMPOSITE MEMBRANE MEANS

BACKGROUND OF THE INVENTION

1. Field of the Invention

This invention relates to a composite dialysis membrane for use in electrodeposition of resins and to the process of using the membrane.

2. Description of the Prior Art

Electrodeposition of resins is known, as disclosed for example by U.S. Pat. No. 3,304,250, the disclosure of which is incorporated herein by reference. That patent, hereafter called the Gilchrist patent, discloses the use of a dialysis membrane to separate and facilitate removal of ions derived from the agents used to solubilize the resins. The background of this problem of removal of undesired ions is described by the Gilchrist patent, wherein the solubilizing agents are referred to as dispersal assistants. Gilchrist also describes at some length the various resins and modifiers which may be used in the electrodeposition bath and process.

The dialysis membranes described in the prior art, such as the Gilchrist patent, have the disadvantage that, in order to be readily permeable by water and the low molecular weight ions derived from the solubilizing agent, the membranes have to be quite thin. For example, regenerated cellulose having a thickness of about two mils has been used. The thinness of these membranes does not readily adapt to itself to use in industrial processes because of tearing and other physical failures in the membrane.

In the more advanced prior art such membranes were supported by perforated supporting walls shown, for example, at 11 in FIG. 1 of Gilchrist. The use of such supporting walls has the obvious disadvantage of severely limiting the membrane area which is available for dialysis.

Applicant has now developed a composite membrane having dialysis properties at least substantially equal to those of prior dialysis membranes but also having sufficient thickness (for example, 1/16 inch) and mechanical strength to be used without supporting members of the type shown in the prior art.

SUMMARY OF THE INVENTION

Applicant has unexpectedly found that a gel means such as an agar gel, which has little mechanical strength, can be combined with a relatively inert nonconducting porous matrix means, formed for example of sintered polyethylene, without substantially sacrificing the dialysis properties of a membrane constructed of gel alone.

Applicant's composite membrane means comprises relatively inert nonconducting porous means as a matrix and gel means having a high water content in the matrix. The matrix and gel together form a relatively strong substantially continuous membrane which is inert relative to the electrodeposition bath and has a low resistance to permeation by water and low molecular weight ions and is substantially impervious to high molecular weight ions, the ions being caused to migrate by the applied electric field.

Applicant's novel process of electrodeposition involves the use of the above described membrane means so as to allow passage therethrough of water and low molecular weight ions. When these ions are neutralized the resulting neutralized product can be removed periodically or continuously from the electrodeposition cell, thus helping to maintain the desired material balance in the electrodeposition bath.

BRIEF DESCRIPTION OF THE DRAWING

FIG. 2 is a graph of mass deposited per coulomb versus applied voltage.

Figure 1:
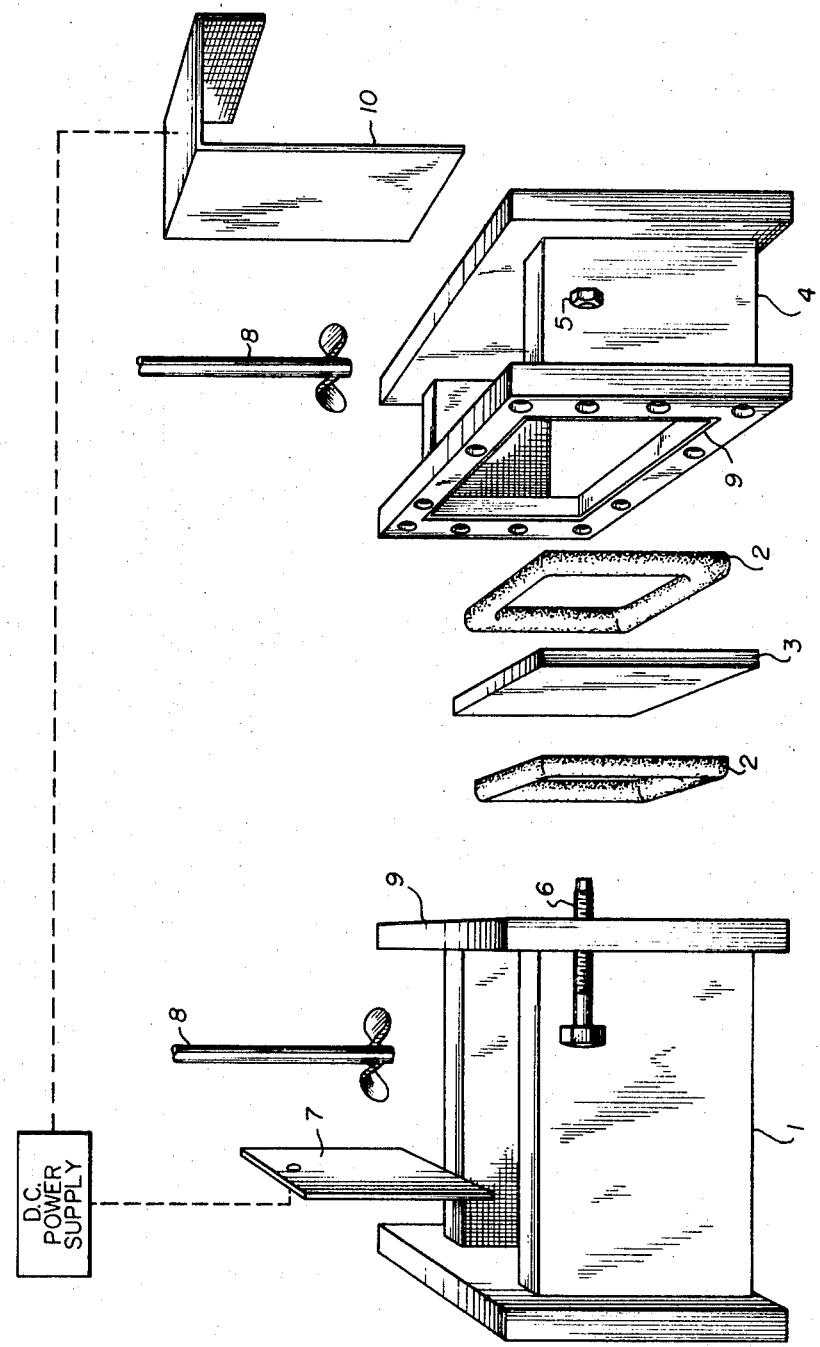
FIG. 1 of the drawings is an exploded view of an electrodeposition cell of the type which can be used in the process of applicant's invention.

Referring more particularly to the drawing, reference numeral 1 indicates a first tank closed on 3 sides and the bottom and open at the top and on the right-hand side. Reference numeral 4 indicates a second tank similar to a mirror image of tank 1. The two tanks are adapted to be bolted together by means of bolts and nuts such as shown at 6 and 5 respectively. Membrane means 3 is interposed between the two tanks. The membrane is sealed around its edges by rubber retaining gaskets 2 which fit into gasket slots 9 around the open sides of the tanks. Reference numerals 8 indicate stirring rods used to agitate the liquid in the tanks. Reference numeral 7 indicates a work piece upon which resins are electrodeposited. In the preferred embodiment this work piece functions as an anode, although by altering resin composition cathodic deposition can also be achieved. Reference numeral 10 indicates the cathode of the preferred embodiment at which ions derived from the solubilizing agents are neutralized. In order to maintain the desirable material balance described in the Gilchrist patent, neutralized material is periodically or continuously removed from tank 4 by means which are not shown. A direct current power supply, which is shown schematically, connects the anode and the cathode and provides the driving force for electrodeposition.

The drawing is of course only exemplary of the general type of apparatus which can be used for electrodeposition. Numerous other designs are within the skill of one skilled in the art.

FIG. 2 will be explained in more detail later.

DESCRIPTION OF THE PREFERRED EMBODIMENT

The selection of particular matrix means for the membrane is not critical. Such means require only that the matrix material be substantially inert relative to the material employed in the electrodepositing bath, that the matrix material be nonconducting so as not to interfere with the electrical properties of the system and that the material in matrix form be sufficiently porous as to present little resistance to passage of water and low molecular weight ions. Examples of suitable materials are porous polyolefins such as polyethylene and polypropylene. Porosity can be obtained in these materials by sintering small particles or by leaching out soluble materials or by any other means known in the art. Porous glass, polyurethane and perhalogenated ethylene polymers can also be employed. As an example of the latter, porous Teflon is suitable. Numerous other materials having similar properties can also be employed.

The average pore size of pores in the matrix, as determined by the method set forth in the Appendix, should be in the range from about 10 microns to about ⅛ inch, preferably from about 20 to 100 microns. Porosity of the matrix material, as determined by the method set forth in the Appendix, should be in the range from about 30 percent to about 50 percent. Average pore size and porosity are exemplary only, and are not critical, the only criticality being that the finished composite membrane readily pass water and low molecular weight ions and be substantially impervious to high molecular weight ions.

The gel means which can be employed in applicant's invention should have a high water content, for example 90 to 99.5 percent water by weight, preferably 95 to 99 percent water. The gel should also be substantially inert with respect to the materials of the electrodeposition bath. The selection of a particular gel means is not critical except that the gel means must freely pass water and low molecular weight ions and must be substantially impervious to high molecular weight ions. Examples of preferred gels are agar, agarose and water swelled synthetic polymers such as a copolymer of acrylamide and methylene bis acrylamide. These examples of preferred gels are merely exemplary and are not intended to be limiting.

The preferred resins for use in applicant's process are amine solubilized carboxylic acid resins and potassium hydroxide solubilized carboxylic acid resins.

The following examples are illustrative of the method of preparation and use of applicant's novel membranes.

EXAMPLE I

A sheet of one-sixteenth inch thick, 35 micron pore size, porous, sintered, linear polyethylene was cut to fit the open sides of the cell tanks (about 6×6 inches). The particular polyethylene used was POR-X, marketed by Porex Materials Corp. of Atlanta, Georgia. The edges of the sheet were sealed with Vinylite solution so as to prevent leakage around the O-rings. A hot (about 95° C.) 3 percent by weight agar (from Bacto-Agar marketed by Difco Laboratories, Detroit, Michigan) aqueous solution was prepared in a Pyrex dish using distilled water. A drop (about 0.02 percent by weight) of Triton X-100 nonionic surfactant was added to the solution to increase wetting properties. The polyethylene sheet was submerged in the hot solution. The dish was allowed to cool until the hot solution gelled in and on the sheet. The sheet was removed and the excess gel peeled off. The sheet was tested for leaks by securing it between the tanks, using silicone grease on the O-rings, and filling one tank with distilled water. No leaks were observed.

The particular manner of preparation of the membrane is not critical as long as the matrix is thoroughly penetrated by gel.

The following examples of electrodeposition by applicant's process were carried out using a membrane prepared in substantially the same manner as that described above.

EXAMPLE II

The anode tank was filled with Black Electrodip Primer, whose composition and preparation are described in the appendix. The cathode tank was filled with distilled water to which one drop of triethylamine was added. The volume of the cathode tank was about 1 liter and of the anode tank about 2.5 liters.

4×6 inch, zinc phosphate coated, 24-gauge cold rolled steel panels were rinsed with reagent grade acetone, air dried and weighed. Four panels were partially immersed in the anode tank and a stainless steel cathode having about the same dimensions as a panel was partially immersed in the cathode tank. 100 volts was applied across the anode and cathode for 10 minutes. The starting pH in the anode tank was 8.10 and in the cathode tank 10.71. The anode and cathode temperatures at start of run were 27.5° C. and 27.9° C., respectively. The anode and cathode temperatures at end of run were 28.6° C. and 28.3° C. respectively. The current flow in milliamperes through the cell varied with time as follows:

| | |
|---|---|
| 1 min. | 422 ma. |
| 1 | 365 |
| 2 | 215 |
| 3 | 175 |
| 4 | 160 |
| 5 | 141 |
| 6 | 121 |
| 7 | 111 |
| 8 | 102 |
| 9 | 95 |
| 10 | 90 |

The electrocoated panels were removed, air dried and then oven dried at 350° F. for 15 minutes followed by 300° F. for 30 minutes. The dried panels were weighed to determine the weight of the electorcoating

| Panel | Initial Weight | Final Weight | Electrocoat Weight |
|---|---|---|---|
| 1 | 77.3596 | 77.6092 | 0.2496 |
| 2 | 78.2306 | 78.4778 | 0.2472 |
| 3 | 75.4661 | 75.7126 | 0.2465 |
| 4 | 76.9430 | 77.1969 | 0.2539 |
| | | Total | 0.9972 |

This was run 84-3.

EXAMPLE III

The same membrane and electrocoat bath were again used and the fifth run (84-5) gave the following results at 100 volts for 10 minutes.

| pH | before | after | Temperature °C | before | after |
|---|---|---|---|---|---|
| anode | 8.22 | 8.15 | anode | 19.6 | 31.1 |
| cathode | 10.88 | 10.90 | cathode | 29.1 | 29.8 |

| Time | Current |
|---|---|
| 0 | 550 ma. |
| 1 | 360 |
| 2 | 218 |
| 3 | 181 |
| 4 | 165 |
| 5 | 139 |
| 6 | 121 |
| 7 | 109 |
| 8 | 100 |
| 9 | 91 |
| 10 | 85 |

| Panel | Initial Weight | Final Weight | Electrocoat Weight |
|---|---|---|---|
| 1 | 77.8167 | 78.0819 | 0.2652 |
| 2 | 77.9249 | 78.1985 | 0.2736 |
| 3 | 78.6824 | 78.9489 | 0.2665 |
| 4 | 78.7797 | 79.0589 | 0.2792 |
| | | | 1.0845 |

EXAMPLE IV

A membrane and electrocoat bath made in substantially the same manner as in the previous examples was used for run 79-3 which gave the following results at 300 volts for 10 minutes.

| pH | | | Temperature °C | | |
|---|---|---|---|---|---|
| | | before | | | after |
| anode | 8.25 | anode | 29.6 | | 32.4 |
| cathode | 10.70 | cathode | 29.3 | | 31.1 |

| Time | Current |
|---|---|
| 0 min. | 1,350 ma. |
| 1 | 315 |
| 2 | 181 |
| 3 | 148 |
| 4 | 131 |
| 5 | 121 |
| 6 | 113 |
| 7 | 107 |
| 8 | 103 |
| 9 | 99 |
| 10 | 95 |

| Panel | Initial Weight | Final Weight | Electrocoat Weight |
|---|---|---|---|
| 1 | 78.2395 | 78.7068 | 0.4673 |
| 2 | 77.1112 | 77.5769 | 0.4657 |
| 3 | 77.7406 | 78.2141 | 0.4735 |
| 4 | 77.7270 | 78.2006 | 0.4736 |
| | | | 1.8801 |

EXAMPLE V

A membrane and electrocoat bath made in the same manner as in the previous examples was used for run 48-1 which gave the following results at 200 volts for 1 minute.

Initial pH

| | | anode | 8.46 | |
|---|---|---|---|---|
| | | cathode | 8.9 | |
| Panel | Initial Weight | Final Weight | Electrocoat Weight | |
| 1 | 75.8204 | 76.0810 | 0.2606 | |
| 2 | 75.9822 | 76.2351 | 0.2529 | |
| 3 | 77.0438 | 77.2948 | 0.2510 | |
| 4 | 76.6520 | 76.9046 | 0.2526 | |
| | | | 1.0171 | |

In the previous examples specific values have been given for voltage, pH, time and temperature. These values are exemplary only and are not critical. The only critical limitations on voltage are that the voltage must be sufficiently high to achieve reasonably rapid electrocoating but must not be so high as to exceed the break down voltage of previously deposited coating. With respect to time, it will be obvious to one skilled in the art to vary the time so as to achieve the desired coating within a practical amount of time; of course considering the effect of changing other variables upon the time. With regard to pH, the pH in the anode zone should be maintained within a range which will achieve the desired ionization and solubilization of the resins. For the above described amine solubilized resins, this range appears to be between about 6.8 and 9.5, preferably between about 8.2 and 8.4. The temperature of the electrocoating bath will normally, as a practical matter, be maintained in the vicinity of room temperature, since there appears to be no reason to cool the bath below room temperature. The bath temperature increases during electrocoating due to the ohmic heating of the bath. A practical maximum temperature is slightly below the melting temperature of the gel.

Numerous runs were made in addition to those used in the examples. Current vs. time curves were plotted for the runs and the curves were integrated to determine the coulombs of electricity consumed per run. The coulomb figures for each run were divided into the electrocoat weight in grams for that run and plotted versus applied voltage as a measure of efficiency. FIG. 2 is a plot so such an efficiency curve for about twenty runs.

It will be noted that the efficiency of the process appears to increase with increasing voltage and also that the efficiency is lowest for the initial run in a given set of runs. This is thought to be due to the time consumed in getting ion flow started through the membrane. It will be noted that there is less difference between the efficiency of runs in a given series as increasingly higher voltages are employed. This appears to be due to the effect of the increased driving force of the higher applied voltages in starting flow through a new membrane. Thus it may be desirable to use a higher voltage to break in a new membrane. Alternatively, a new membrane may be conditioned, for example by soaking it in a solution of a low molecular weight ionizable material such as potassium hydroxide, ammonium bicarbonate or ammonium citrate.

The coated panels produced by the above runs had uniform, smooth, glossy coatings equivalent in appearance to panels produced by prior art processes.

After a series of runs was made using the above-described electrocoating bath, the cathode solution was withdrawn and replaced with new cathode solution. In larger baths and/or baths used to plate more panels, it may be desirable to continuously replace the cathode solution or to replace it at more frequent intervals.

The triethylamine used in the cathode solution is used to render the distilled water conductive. Many other conductive materials which could be used will be obvious to one skilled in the art.

APPENDIX

Black Electrodip Primer is a product of the Finishes Division of Inmont Corporation of Detroit, Mich. It is made as follows:

An allyl alcohol-styrene copolymer is reacted with tall oil fatty acid and the resulting product is reacted with maleic anhydride. This acid-containing resin is then dissolved in Pent-Oxone, a long chain ketone. An aqueous emulsion of this solution is then prepared with the aid of triethylamine. The final primer is then made by the addition of a paste consisting of pigment and water-solubilized maleinized linseed oil to this emulsion.

Although the above-described composition was used in the examples, it is not critical and numerous other useable resin composition will be apparent to those skilled in the electrocoating art.

The method of determining average pore size is by use of a mercury penetration porosimeter. For example, a Numinco MIC900 mercury penetration porosimeter can be used. The method of use of such an instrument is described in "Preliminary Data Sheet" available from the manufacture, Numec Instruments and Controls Corp., 300 Seco Road, Monroeville, Pa.

The method of determining porosity is as follows:
1. weigh unfilled matrix panel
2. weigh agar gel filled matrix panel
3. subtract 1 from 2.
4. divide 3 by the density of agar (approximately 1g./cc.)
5. divide 4 by the measured volume of the panel, as determined by multiplying length, width and thickness.

I claim:
1. The process of electrodeposition of solubilized resins comprising:
   a. passing an electric current through an aqueous bath containing said solubilized resins so as to cause migration of relatively high and low molecular weight ions, the bath having an anode and a cathode separated by membrane means which divides the bath into two zones
   b. neutralizing the anions at the anode
   c. neutralizing the cations at the cathode and
   d. withdrawing product of low molecular weight ion neutralization
   e. the membrane means comprising
      1. relatively inert, nonconductive porous means forming a supporting matrix and
      2. gel means having a high water content in the matrix and forming therewith a relatively strong substantially continuous membrane,
   f. the membrane being readily permeated by said low molecular weight ions and water but substantially impermeable to said high molecular weight ions

2. The process of claim 1 wherein the solubilized resins are carboxylic acid resins, resin is deposited at the anode and neutralized cation product is withdrawn from the cathode zone.

3. The process of claim 2 wherein the carboxylic acid resins are amine solubilized.

4. The process of claim 2 wherein the carboxylic acid resins are potassium hydroxide solubilized.

5. The process of claim 1 wherein the matrix is polyethylene and the gel is agar.

* * * * *